United States Patent
Matsumoto et al.

(10) Patent No.: US 9,053,717 B1
(45) Date of Patent: Jun. 9, 2015

(54) PHOTODIODE INTEGRATED EDGE EMITTING LASER FOR HEAT ASSISTED MAGNETIC RECORDING

(71) Applicant: HGST Netherlands B.V., Amsterdam (NL)

(72) Inventors: Takuya Matsumoto, Sunnyvale, CA (US); Shen Ren, Union City, CA (US); Tomoaki Uno, Kobe (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/335,087

(22) Filed: Jul. 18, 2014

(51) Int. Cl.
G11B 11/00 (2006.01)
G11B 5/31 (2006.01)
G11B 5/48 (2006.01)
G11B 5/60 (2006.01)

(52) U.S. Cl.
CPC .............. *G11B 5/314* (2013.01); *G11B 5/6088* (2013.01); *G11B 5/4866* (2013.01)

(58) Field of Classification Search
CPC ................ G11B 5/4866; G11B 2005/0021; G11B 5/314; G11B 5/6088; G11B 5/001; G11B 7/1387; G11B 11/10554; G11B 11/1058; G11B 7/1384; G11B 7/1206; G11B 13/08

USPC .......... 369/13.33, 13.32, 13.24, 13.14, 13.03, 369/13.02, 13.12, 13.13, 13.22, 13.01, 369/13.35, 112.27

See application file for complete search history.

(56) References Cited

U.S. PATENT DOCUMENTS

| | | | |
|---|---|---|---|
| 7,898,759 B2 | 3/2011 | Matsumoto et al. | |
| 8,149,653 B2 | 4/2012 | Shimazawa et al. | |
| 8,243,561 B2 | 8/2012 | Matsumoto | |
| 8,341,825 B2 | 1/2013 | Hara et al. | |
| 8,369,191 B2 | 2/2013 | Shimazawa | |
| 8,406,091 B2 | 3/2013 | Shimazawa et al. | |
| 8,437,237 B2 | 5/2013 | Komura et al. | |
| 8,509,036 B2 * | 8/2013 | Shimazawa et al. | 369/13.13 |
| 2011/0228651 A1 | 9/2011 | Gage et al. | |

* cited by examiner

*Primary Examiner* — Ali Neyzari
(74) *Attorney, Agent, or Firm* — Patterson & Sheridan, LLP

(57) ABSTRACT

Embodiments disclosed herein generally relate to a magnetic recording device including slider, a magnetic head assembly and a laser diode having a photodiode integrated therein. The photodiode and the laser diode are both fabricated on a structure. Having the integrated laser diode and photodiode reduces the cost relating to fabricating individual, discrete photodiode and assembling the individual, discrete photodiode on the magnetic recording device.

17 Claims, 15 Drawing Sheets

PHOTODIODE INTEGRATED EDGE EMITTING LASER FOR HEAT ASSISTED MAGNETIC RECORDING

BACKGROUND

1. Field

Embodiments disclosed herein generally relate to data storage systems, and more particularly, to heat-assisted magnetic recording (HAMR) systems.

2. Description of the Related Art

Higher storage areal densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

Typically, a laser is mounted on a slider of a HAMR system, and a photodiode is mounted a distance away from the laser on the slider. The photodiode may be used to monitor the intensity of the laser power in order to stabilize the laser power against variations in the environment as well as degradation of the laser due to long term operation. The cost of fabricating the photodiode and assembling the fabricated photodiode to the HAMR system may be high. Therefore, there is a need in the art for an improved HAMR system.

SUMMARY

Embodiments disclosed herein generally relate to a magnetic recording device including slider, a magnetic head assembly and a laser diode having a photodiode integrated therein. The photodiode and the laser diode are both fabricated on a substrate. Having the integrated laser diode and photodiode reduces the cost relating to fabricating individual, discrete photodiode and assembling the individual, discrete photodiode on the magnetic recording device.

In one embodiment, a magnetic recording device is disclosed. The magnetic recording device includes a slider, a magnetic head assembly coupled to the slider, a submount disposed over the slider and the magnetic head assembly, and a structure coupled to the submount. The structure is disposed over the magnetic head assembly and the structure includes a laser diode having a substrate. The structure further includes a photodiode, the photodiode shares the substrate with the laser diode, and the substrate is distinct from the magnetic head assembly and the submount.

In another embodiment, a heat-assisted magnetic recording system is disclosed. The heat-assisted magnetic recording system includes a slider, a magnetic write head, where the magnetic write head includes a first waveguide, a submount disposed over the slider and the magnetic write head, and a structure coupled to the submount, where the structure is disposed over the magnetic write head. The structure includes a laser diode having a substrate and an active layer, where the active layer is aligned with the first waveguide. The structure further includes a first photodiode, where the first photodiode shares the substrate with the laser diode.

In another embodiment, a hard disk drive is disclosed. The hard disk drive includes a magnetic media, a slider including a media facing surface and a surface opposite the media facing surface, a magnetic write head coupled to the slider, where the magnetic write head has a media facing surface and a surface opposite the media facing surface, a submount disposed over the slider and the magnetic write head, and a structure coupled to the submount, where the structure is disposed over the magnetic write head. The structure includes a laser diode disposed above the surface of the slider and the surface of the magnetic write head, where the laser diode includes a substrate, and a photodiode disposed above the surface of the slider and the surface of the magnetic write head, where the photodiode and the laser diode share the substrate.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a magnetic recording device including slider, a magnetic head assembly and a laser diode having a photodiode integrated therein. The photodiode and the laser diode are both fabricated on a substrate. Having the integrated laser diode and photodiode reduces the cost relating to fabricating individual, discrete photodiode and assembling the individual, discrete photodiode on the magnetic recording device.

Figure 1:
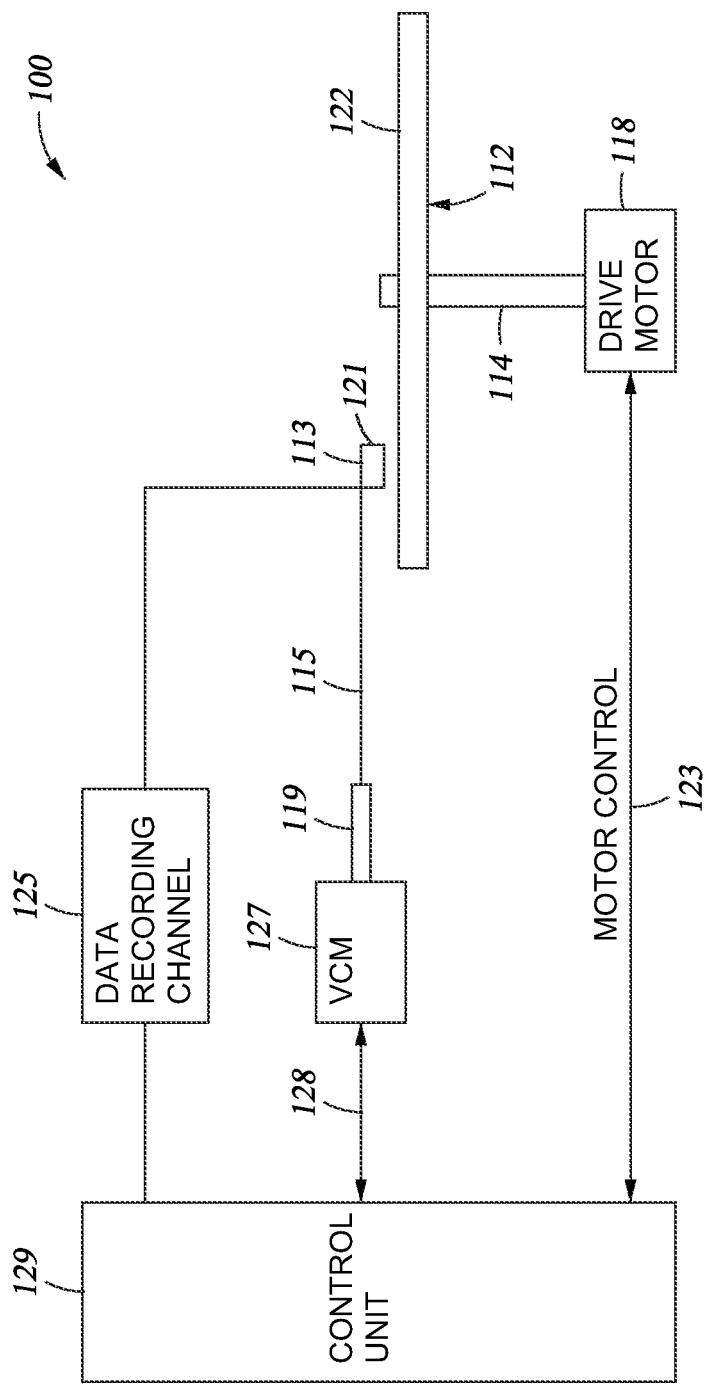
FIG. 1 illustrates a disk drive system, according to embodiments described herein.

FIG. 1 illustrates a disk drive 100 according to one embodiment disclosed herein. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121, a radiation source (e.g., a laser diode) for heating the disk surface 122, and a photodiode integrated into the radiation source for monitor the radiation intensity. As the magnetic disk rotates, the slider 113 moves radially in and out over the disk surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic media 112 generates an air bearing between the slider 113 and the disk surface 122 which exerts an upward force or lift on the slider 113. The air bearing thus counter-balances the slight spring force of suspension 115 and supports slider 113 off and slightly above the media 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of the magnetic disk storage system and the accompanying illustration of FIG. 1 are for representation purposes only. It should be apparent that disk storage systems may contain a large number of disks and actuators, and each actuator may support a number of sliders.

Figure 2:
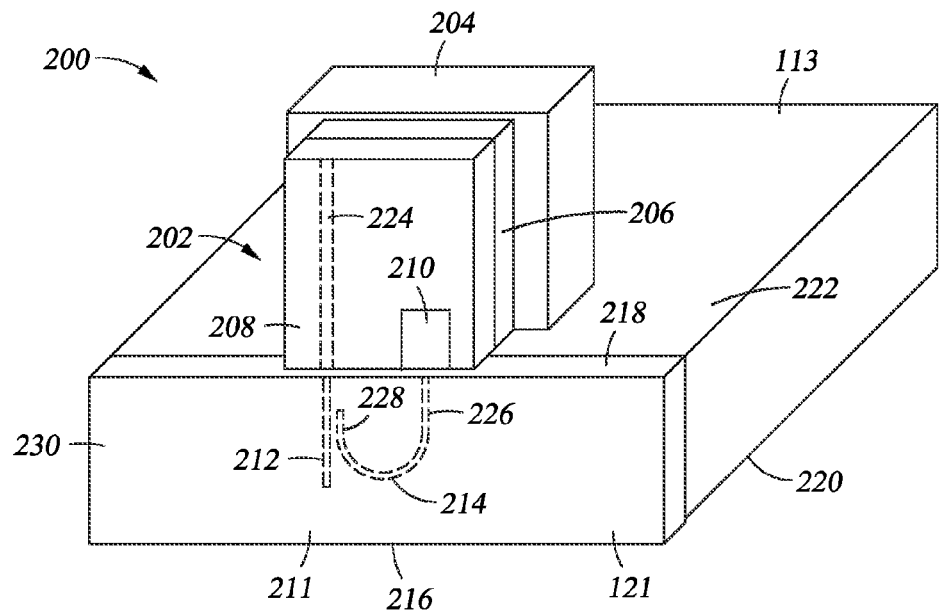
FIG. 2 is a perspective view of a magnetic recording device according to embodiments described herein.

FIG. 2 is a perspective view of a magnetic recording device 200 according to embodiments described herein. The magnetic recording device 200 may include the slider 113 and the magnetic head assembly 121 coupled to the slider 113. The magnetic head assembly 121 may include a magnetic read head (not shown) and a magnetic write head 211, which may include a first waveguide 212 and a second waveguide 214. The waveguides 212, 214 may be embedded in the magnetic write head 211, thus are represented using dotted lines. The magnetic write head 211 may include a media facing surface (MFS) 216, such as an air bearing surface (ABS), that is facing the magnetic media (not shown), such as the magnetic media 112 shown in FIG. 1. The magnetic write head 211 may include a surface 218 that is opposite the MFS 216 and a trailing surface 230. The slider 113 may include a MFS 220 and a surface 222 opposite the MFS 220. In one embodiment, the MFSs 216, 220 are coplanar and the surfaces 218, 222 are coplanar. A structure 202 may be disposed over the surface 218 of the magnetic write head 211 and the surface 222 of the slider 113. The structure 202 may be coupled to a submount 204, and the submount 204 may be disposed on the surface 222 of the slider 113. In one embodiment, the structure 202 is not contacting surfaces 218, 222.

The structure 202 may include a radiation source, such as a laser diode 208, and a power monitoring device, such as a photodiode 210. In other words, the photodiode 210 may be integrated together with the laser diode 208 on the same substrate. Both the laser diode 208 and the photodiode 210 include a common substrate 206. The substrate 206 may be coupled to the submount 204. In one embodiment, the substrate 206 is oriented substantially parallel to the trailing surface 230 of the magnetic write head 211. In other words, the surface of the substrate 206 having the largest surface area may be substantially parallel to the trailing surface 230 of the magnetic write head 211. The laser diode 208 may include an active layer 224, which may be embedded in the laser diode 208 and optically aligned with the first waveguide 212. The photodiode 210 may include an active layer (not shown) that may or may not be optically aligned with a portion 226 of the second waveguide 214. During operation, the laser beam generated from the laser diode 208 may be coupled to the first waveguide 212 via a spot size converter (not shown). A portion of the coupled laser beam may go to the second waveguide 214 through a directional coupler 228, and the second waveguide 214 guides the portion of the coupled laser beam towards the photodiode 210. The photodiode 210 detects and measures the intensity of the portion of the laser beam and adjust the laser current so the laser beam having constant intensity is delivered to the magnetic media (not shown). By integrating the photodiode 210 and the laser diode 208 into the structure 202, the photodiode 210 and the laser diode 208 may be fabricated at the same time using the same tools, leading to a reduction in fabrication cost. The laser diode 208 may be any suitable laser diode, and the photodiode 210 may be a p-n junction, p-i-n junction, metal-semiconductor junction (Schottky barrier), or any other structure that can detect light at the wavelength of laser diode 208.

Figure 3:
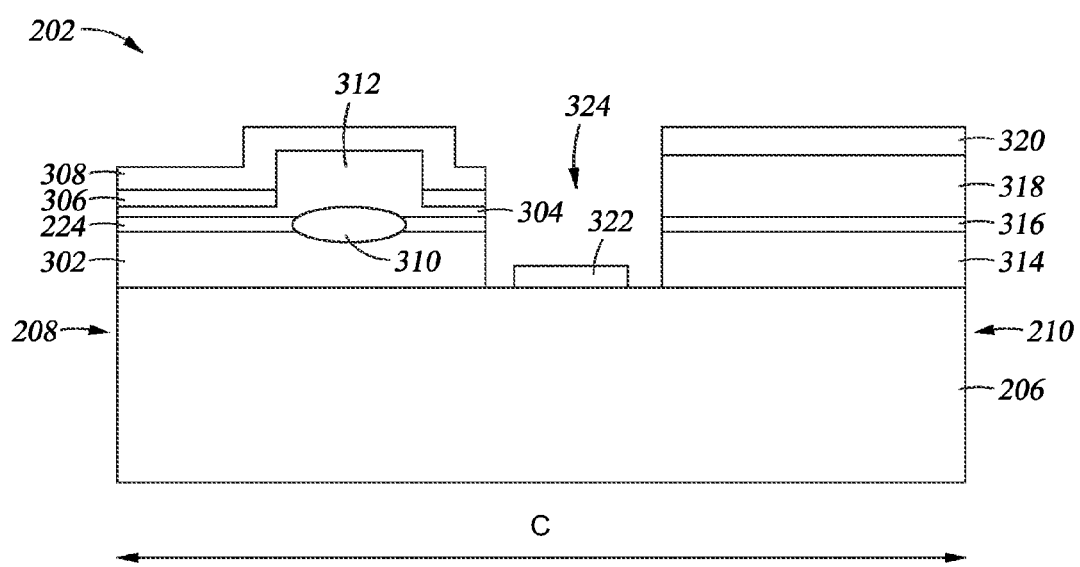
FIG. 3 is a bottom view of a structure according to embodiments described herein.

FIG. 3 is a bottom view of the structure 202 according to embodiments described herein. The structure 202 includes the laser diode 208 and the photodiode 210. In one embodiment, the laser diode 208 has a hetero structure and includes the substrate 206, a first cladding layer 302, the active layer 224, a second cladding layer 304, an insulator layer 306 and an electrode 308. The substrate 206 in this configuration may be an n-type GaAs substrate, the active layer 206 may be a GaAs layer, the first cladding layer 302 may be an n-type AlGaAs layer and the second cladding layer 304 may be a p-type AlGaAs layer. The laser diode 208 may also include an emission point 310. A ridge structure 312 is disposed over the active layer 224 to confine the laser light generated from the emission point 310. In one embodiment, the active layer 224 may have a thickness of about 50 nm and the first cladding layer 304 may have a thickness from about 3 microns to about 6 microns.

Similar layered structure may be used for the photodiode 210. In one embodiment, the photodiode 210 includes the substrate 206, a first cladding layer 314, an active layer 316, a second cladding layer 318 and an electrode 320. The active layer 316 may be a GaAs layer, the first cladding layer 314 may be an n-type AlGaAs layer and the second cladding layer 318 may be a p-type AlGaAs layer. Because the layered structures of the laser diode 208 and the photodiode 210 are similar, i.e., electrodes 308, 320 are disposed over the first cladding layers 304, 318, which are disposed over active layers 224, 316, which are disposed over the second cladding layers 302, 314, which are disposed over the substrate 206, the laser diode 208 and the photodiode 210 may be fabricated at the same time using the same processing chambers, thus reducing the cost of fabricating and assembling the photodiode. The active layers 224, 316 of the laser diode 208 and the photodiode 210, respectively, may be separated by a gap 324, and a ground electrode 322 may be disposed in the gap 324. The electrode 322 may be a ground electrode. As shown in FIG. 3, the active layer 224 of the laser diode 202 and the active layer 316 of the photodiode 210 may be aligned in a cross-track direction "C". The active layers 224, 316 may have the same thickness or different thicknesses. In one embodiment, the thickness of the active layer 316 is about 3 to 5 microns, which may be greater than the thickness of the active layer 224. The increased thickness of the active layer 316 of the photodiode 210 helps increase the amount of light that is directly detected by the photodiode 210.

Figure 4A:
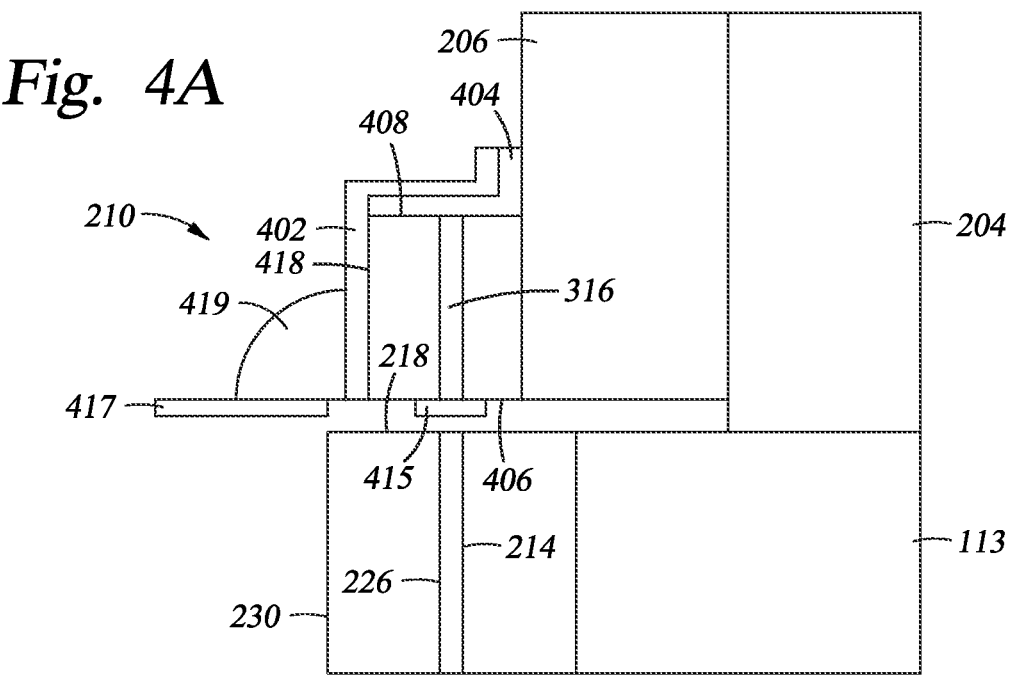
FIGS. 4A-4C are cross sectional side views of the photodiode according to embodiments described herein.
Figure 4B:
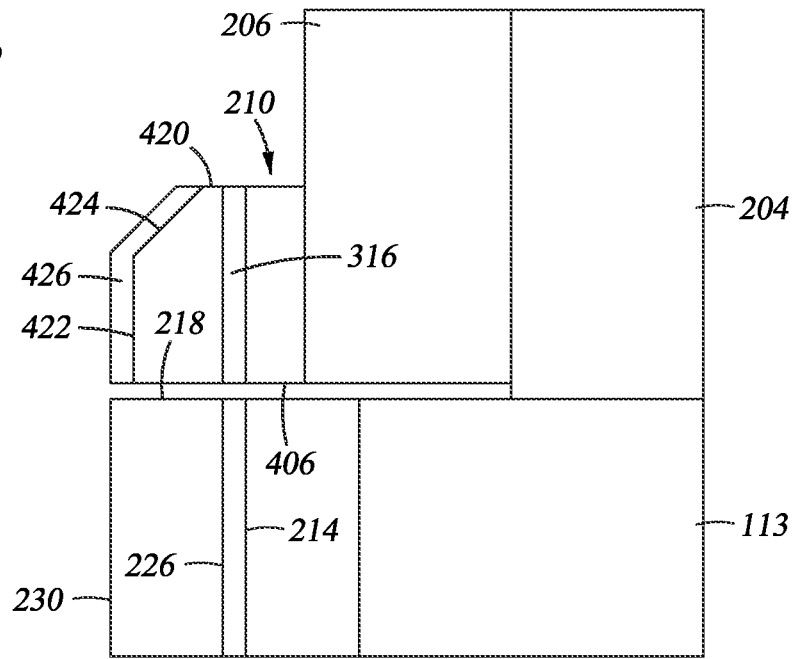
Figure 4C:
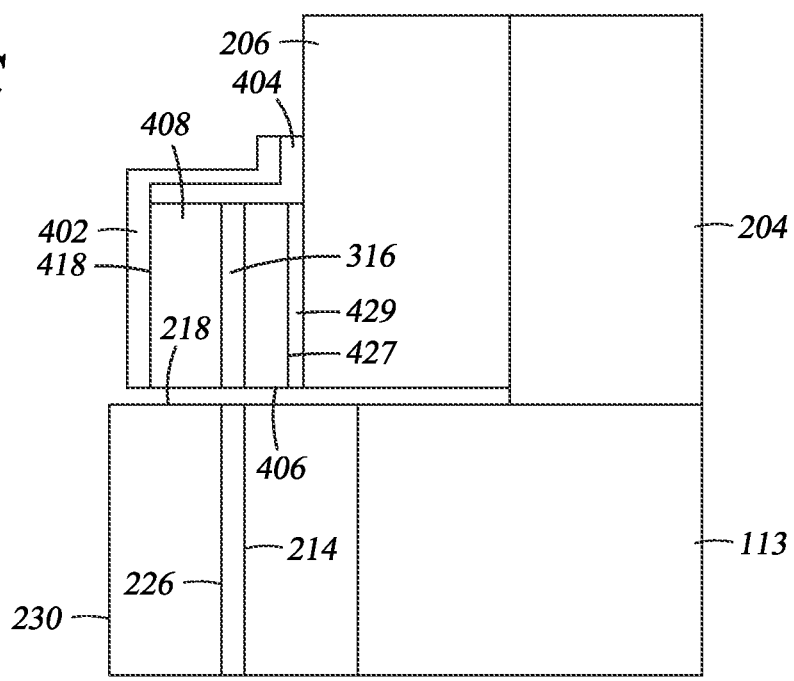

FIGS. 4A-4C are cross sectional side views of the photodiode 210 according to embodiments described herein. To improve the sensitivity of the photodiode 210, a reflection layer may be used to cover one or more surfaces of the photodiode 210. More light is reflected by the reflection layer and the amount of light detected by the photodiode 210 is increased. As shown in FIG. 4A, a reflection layer 402 is disposed over the photodiode 210. The reflection layer 402 may be made of any reflective metal, such as Au, Ag, Cu, Al, Cr, Mo, W, or alloy thereof. The reflection layer 402 may also function as an electrode. An electrode 417 may be electrically coupled to the reflection layer 402 by solder 419. The solder 419 may be any conductive material, such as silver paste. The electrode 417 may be suspended by the solder 419. The photodiode 210 may have a surface 406 facing the surface 218 of the magnetic write head 211, a surface 408 opposite the surface 406 and a surface 418 connecting the surfaces 406, 408. In one embodiment, an insulator layer 404 may be disposed over the surface 408 of the photodiode, and the reflection layer 402 may be disposed adjacent the surface 418 and over the insulator layer 404. The light directed to the photodiode 210 by the portion 226 of the second waveguide 214 may be diffused into the cladding layers of the photodiode 210, and the reflection layer 402 helps reflect the light diffused into the cladding layer towards the active layer 316 of the photodiode 210, leading to improved sensitivity. In addition, sensitivity may be further improved by disposing an antireflection (AR) layer 415 on the surface 406, where the AR layer 415 may be optically aligned with the active layer 316 of the photodiode 210 and the second waveguide 214.

FIG. 4B shows a cross sectional side view of the photodiode 210 according to one embodiment described herein. The photodiode 210 may include the surface 406 facing the surface 218 of the magnetic write head 211, a surface 420 opposite the surface 406, a surface 422 that is substantially perpendicular to the surface 406 and a slant surface 424 connecting the surface 422 and the surface 420. The slant surface 424 can reflect more light toward the active layer 316 to increase the sensitivity of the photodiode 210. The slant surface 424 may be a straight surface as shown in FIG. 4B. Alternatively, the slant surface 424 may be a curved surface to improve the collection efficiency. A reflection layer 426 may be disposed adjacent the surfaces 422, 424, and the reflection layer 426 may be made of the same material as the reflection layer 402. Similar to the reflection layer 402, the reflection layer 426 helps reflect the light diffused into the cladding layer towards the active layer of the photodiode 210. An electrode (not shown) may be electrically coupled to the reflection layer 426 by solder (not shown), and an AR layer (not shown) may be disposed on the surface 406, where the AR layer may be optically aligned with the active layer 316 of the photodiode 210 and the second waveguide 214.

FIG. 4C shows a cross sectional side view of the photodiode 210 according to one embodiment described herein. The photodiode 210 may include the surface 406 facing the surface 218, the surface 408 opposite the surface 406, the surface 418 connecting the surface 406 and the surface 408, and a surface 427 opposite the surface 418. The reflection layer 402 may be disposed adjacent the surface 418 and over the surface 408. Disposed between the surface 427 and the substrate 206 is a second reflection layer 429, and the insulator layer 404 and the reflection layer 402 may be disposed over the second reflection layer 429. The second reflection layer 429 may be made of the same material as the reflection layer 402. Both reflection layers 402, 429 help reflect light diffused into the cladding layers towards the active layer of the photodiode 210. An electrode (not shown) may be electrically coupled to the reflection layer 402 by solder (not shown), and an AR layer (not shown) may be disposed on the surface 406, where the AR layer may be optically aligned with the active layer 316 of the photodiode 210 and the second waveguide 214.

Figure 5A:
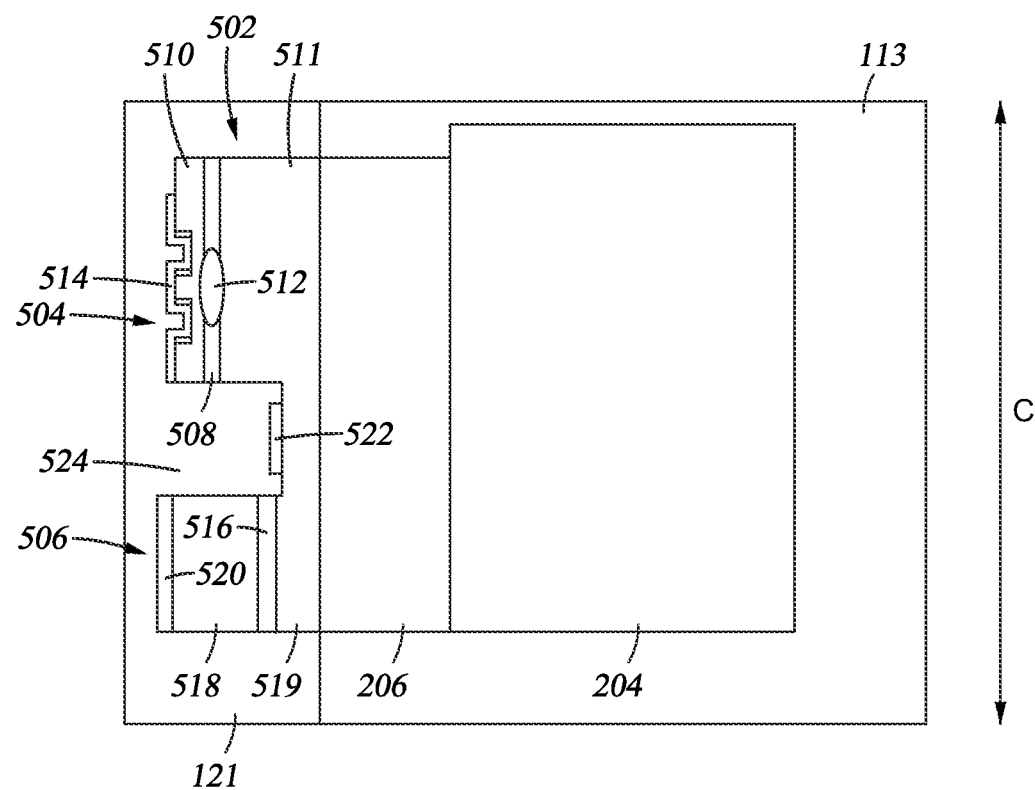
FIGS. 5A-5C illustrate a structure having a laser diode and a photodiode according to various embodiments described herein.
Figure 5B:
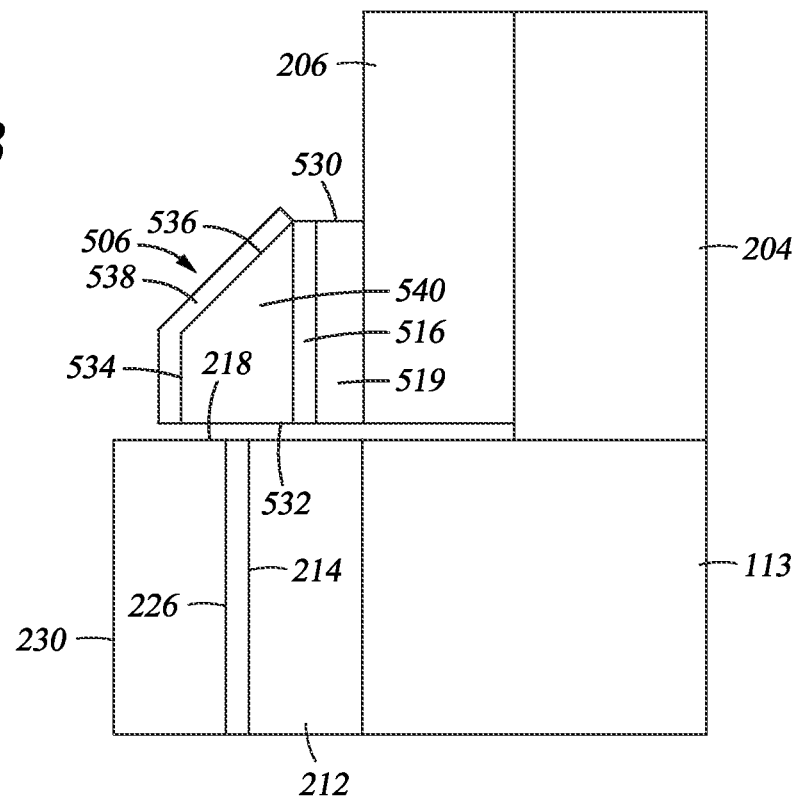
Figure 5C:
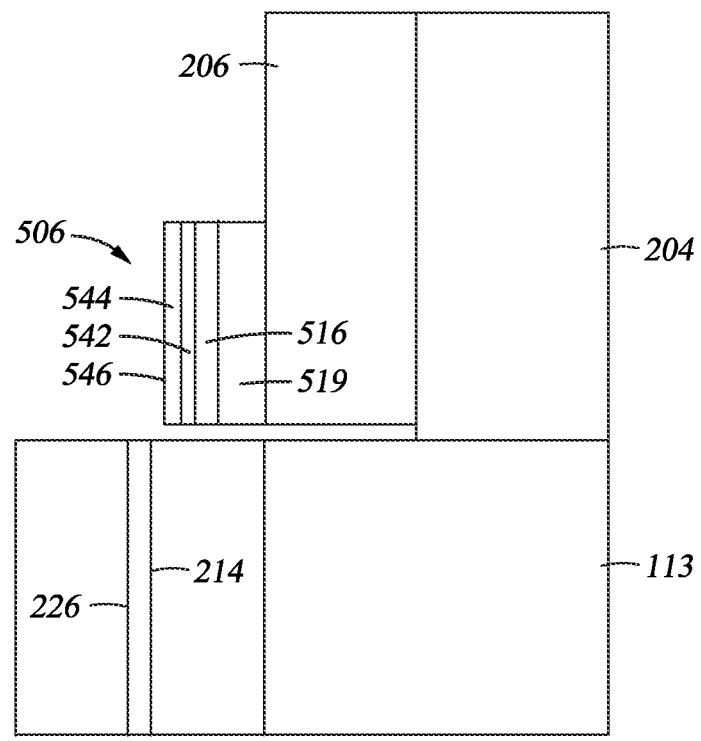

FIG. 5A is a top view of a structure 502 disposed above the slider 113 and the magnetic head assembly 121 according to one embodiment. Similar to the structure 202, the structure 502 may be coupled to the submount 204 and may include a laser diode 504 and a photodiode 506. The laser diode 504 may include an active layer 508 surrounded by cladding layers 510, 511, and the cladding layer 511 may be coupled to the substrate 206. The active layer 508 may have an emission point 512 for emitting a laser beam. An electrode 514 may be coupled to the cladding layer 510. The photodiode 506 may include an active layer 516 surrounded by cladding layers 518, 519, and the cladding layer 519 may be coupled to the substrate 206. An electrode 520 may be coupled to the cladding layer 518. The active layers 508, 516 may be separated by a gap 524 and an electrode 522 may be disposed in the gap 524. The electrode 522 may be a ground electrode. Unlike the active layer 224 and the active layer 316 of the structure 202, the active layer 508 and active layer 516 of the structure 502 may be offset, i.e., not aligned in the cross-track direction "C". Thus, the portion 226 of the second waveguide 214 (shown in FIG. 2) may not be optically aligned with the active layer 516 of the photodiode 506. FIGS. 5B and 5C illustrate configurations of the photodiode 506 that can detect the light out of the second waveguide 214, even though the active layer 516 is not aligned with the second waveguide 214.

FIG. 5B is a cross sectional side view of the photodiode 506 according to one embodiment. The photodiode 506 may have a first surface 532 facing the surface 218 of the magnetic write head 211 and a second surface 530 opposite the first surface 532. The photodiode 506 may also have a third surface 534 substantially perpendicular to the first and second surfaces 532, 530, and a slant surface 536 connecting the third surface 534 to the second surface 530. A reflection layer 538 may be disposed adjacent the third surface 534 and over the slant surface 536. The reflection layer 538 may be made of the same material as the reflection layers 402, 426 shown in FIGS. 4A-4C. The reflection layer 538 reflects the light diffused in the cladding layer 540 from the second waveguide 214 towards the active layer 516. Thus, even though the active layer 516 is not optically aligned with the second waveguide 214, the photodiode 506 can detect light coming out of the second waveguide 214 because of the reflection layer 538.

FIG. 5C is a cross sectional view of the photodiode 506 according to one embodiment. The photodiode 506 may have the cladding layer 519, the active layer 516, a cladding layer 542 and an AR coating 544 disposed adjacent the cladding layer 542. Since no part of the photodiode 506 is located above the second waveguide 214, the light coming out of the second waveguide 214 may be detected by the photodiode 506 through a side surface 546. The AR coating 544 reduces reflection, thus letting more light reach the active layer 516.

Figure 6:
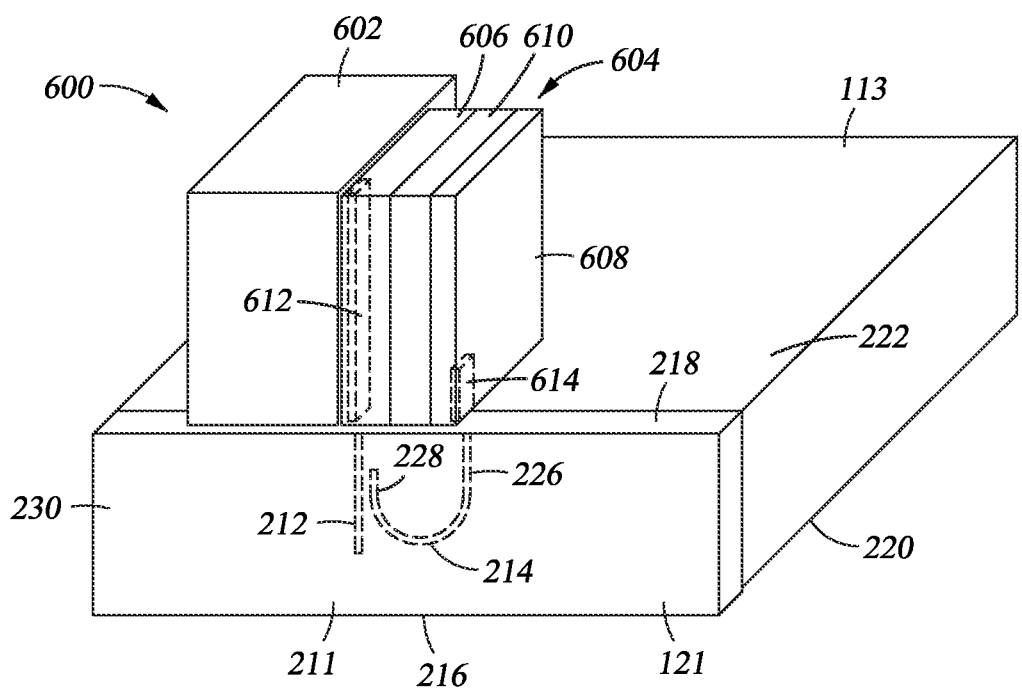
FIG. 6 is a perspective view of a magnetic recording device according to embodiments described herein.

FIG. 6 is a perspective view of a magnetic recording device 600 according to embodiments described herein. The magnetic recording device 600 may include the slider 113 and the magnetic head assembly 121 coupled to the slider 113. The magnetic head assembly 121 may include the magnetic write head 211, which may include the first waveguide 212 and the second waveguide 214. The waveguides 212, 214 may be embedded in the magnetic write head 211, thus are represented using dotted lines. The magnetic write head 211 may include the MFS 216 that is facing the magnetic media (not shown), such as the magnetic media 112 shown in FIG. 1. The magnetic write head 211 may include the surface 218 that is opposite the MFS 216 and the trailing surface 230. The slider 113 may include the MFS 220 and the surface 222 opposite the MFS 220. In one embodiment, the MFSs 216, 220 are coplanar and the surfaces 218, 222 are coplanar. A structure 604 may be disposed over the surface 218 of the magnetic write head 211 and the surface 222 of the slider 113. The structure 604 may be coupled to a submount 602, and the submount 602 may be disposed on the surface 222 of the slider 113. In one embodiment, the structure 604 is not contacting surfaces 218, 222.

The structure 604 may include a radiation source, such as a laser diode 606, and a power monitoring device, such as a photodiode 608. In other words, the photodiode 608 may be integrated into the laser diode 606. Both the laser diode 606 and the photodiode 608 include a common substrate 610. In one embodiment, the substrate 610 is oriented substantially perpendicular to the trailing surface 230 of the magnetic write head 211. In other words, the surface of the substrate 610 having the largest surface area may be substantially perpendicular to the trailing surface 230 of the magnetic write head 211. The laser diode 606 may include an active layer 612, which may be embedded in the laser diode 606 and optically aligned with the first waveguide 212. The photodiode 608 may include an active layer 614 that may or may not be aligned with the portion 226 of the second waveguide 214. During operation, the laser beam generated from the laser diode 606 may be coupled to the first waveguide 212 via a spot size converter (not shown). A portion of the coupled laser beam may go to the second waveguide 214 through the directional coupler 228, and the second waveguide 214 guides the portion of the coupled laser beam towards the photodiode 608. The photodiode 608 detects and measures the intensity of the portion of the laser beam and adjusts the laser current so the laser beam having constant intensity is delivered to the magnetic media (not shown). By integrating the photodiode 608 and the laser diode 606 into the structure 604, the photodiode 608 and the laser diode 606 may be fabricated at the same time using the same tools, leading to a reduction in fabrication cost. The laser diode 606 may be any suitable laser diode, and the photodiode 608 may be a p-n junction, p-i-n junction, metal-semiconductor junction (Schottky barrier), or any other structure that can detect light. The laser diode 606 and the photodiode 608 may be disposed on opposite sides of the substrate 610, as shown in FIG. 6.

Figure 7A:
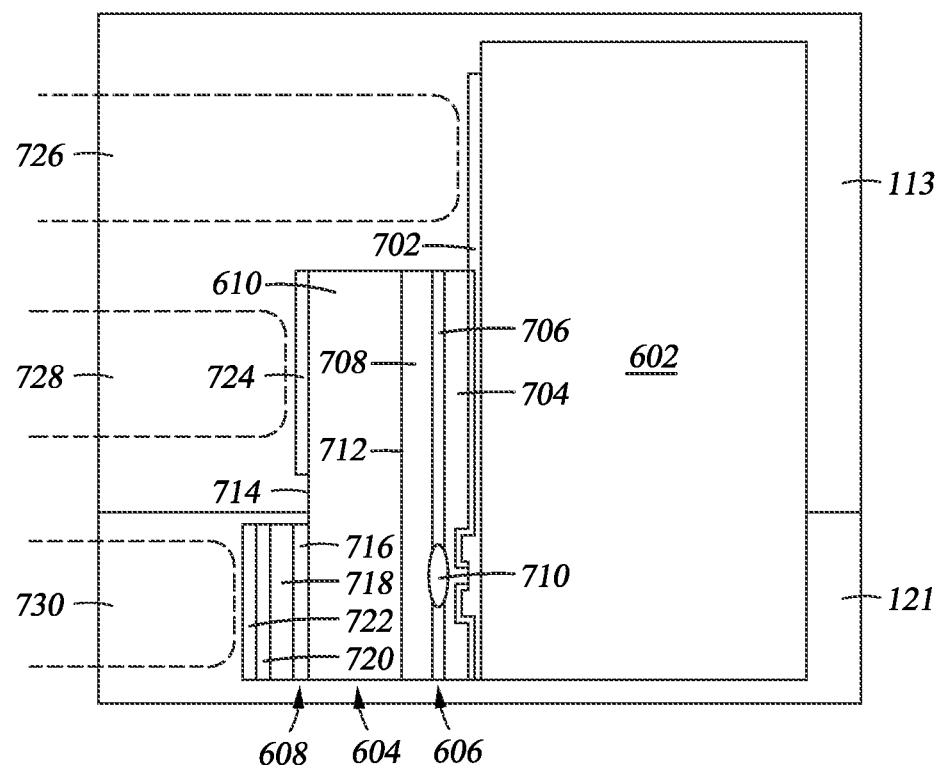
FIGS. 7A-7E illustrate a structure having a laser diode and a photodiode disposed over a slider according to embodiments described herein.

FIGS. 7A-7E illustrate the structure 604 having the laser diode 606 and photodiode 608 disposed on opposite sides of the substrate 610 according to embodiments described herein. FIG. 7A is a top view of the structure 604 having the laser diode 606 and the photodiode 608 disposed on opposite sides of the substrate 610. As shown in FIG. 7A, the structure 604 may be coupled to the submount 602 via an electrode 702. More specifically, the laser diode 606 may be coupled to the submount 602 via the electrode 702, and the electrode 702 may serve as an electrical contact for the laser diode 606. The laser diode 606 may include a first cladding layer 704, an active layer 706, a second cladding layer 708, and the substrate 610. The substrate 610 in this configuration may be an n-type GaAs substrate, the active layer 706 may be a GaAs layer, the first cladding layer 704 may be an n-type AlGaAs layer and the second cladding layer 708 may be a p-type AlGaAs layer. The laser diode 606 may also include an emission point 710. The second cladding layer 708 may be disposed adjacent a surface 712 of the substrate 610.

The photodiode 608 may include a first cladding layer 716, an active layer 718, a second cladding layer 720 and the substrate 610. In one configuration, the first cladding layer 716 may be disposed adjacent a surface 714 of the substrate 610, where the surface 714 is opposite the surface 712. The active layer 718 may be a GaAs layer, the first cladding layer 716 may be an n-type AlGaAs layer, the second cladding layer 720 may be a p-type AlGaAs layer, and the substrate 610 may be an n-type substrate. An electrode 722 may be coupled to the photodiode 608. The electrode 722 may be disposed adjacent the second cladding layer 720 and may serve as a reflection layer to improve the sensitivity of the photodiode 608. An electrode 724 may be disposed on the surface 714 of the substrate 610. The electrode 724 may be a ground electrode. Suspended electrodes 726, 728, 730 may be electrically coupled to the electrodes 702, 724, 722, respectively, via solder 732 (shown in FIG. 7B). The solder 732 may be any electrically conductive material, such as silver paste.

Figure 7B:
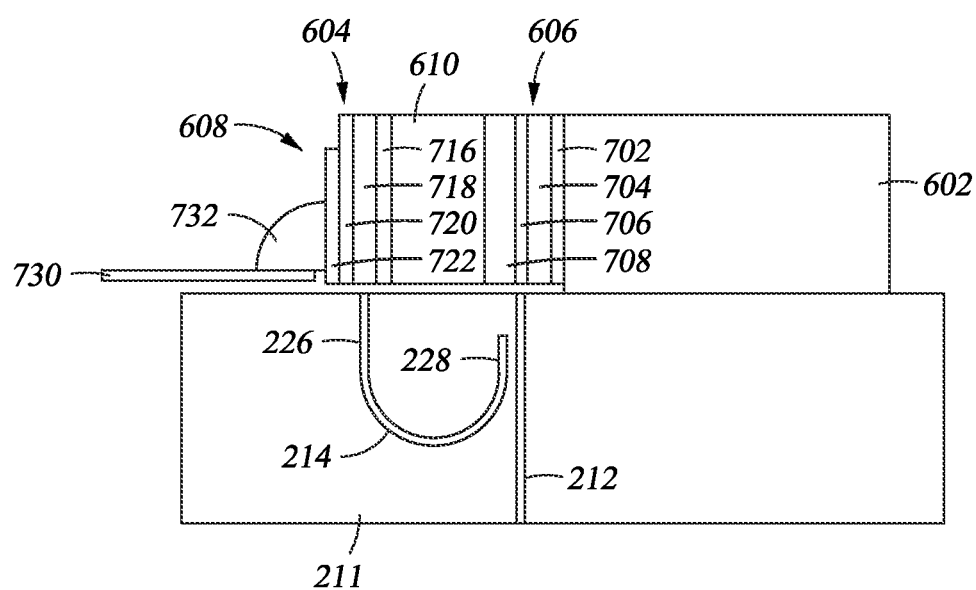

FIG. 7B is a front view of the structure 604 according to embodiments described herein. As shown in FIG. 7B, the active layer 706 of the laser diode 606 is optically aligned with the first waveguide 212 of the magnetic write head 211 and the active layer 718 of the photodiode 608 may be optically aligned with the portion 226 of the second waveguide 214 of the magnetic write head 211.

Figure 7C:
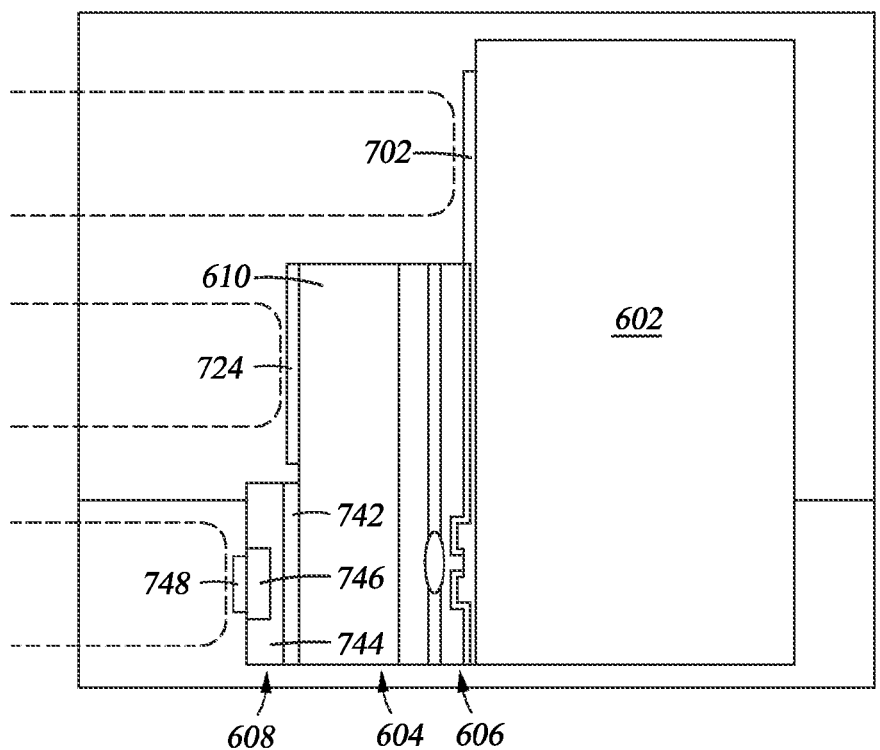

FIG. 7C is a top view of the structure 604 according to embodiments described herein. The structure 604 may include the laser diode 606 and the photodiode 608. The photodiode 608 may include the substrate 610, a first n-type layer 742 disposed adjacent the substrate 610, a second n-type layer 744 disposed adjacent the first n-type layer 742 and an active layer 746 embedded in the second n-type layer 744. In one embodiment, the substrate 610 is an n-type GaAs substrate, the first n-type layer 742 is an n-type AlGaAs layer, the second n-type layer 744 is an n-type GaAs layer and the active layer 746 may be an ion doped p-n junction. In one embodiment, the active layer 746 may be a $Zn^+$ ion doped p-n junction. The $Zn^+$ ion doped p-n junction may be formed by $Zn^+$ ion implant or thermal diffusion of Zn into n-type GaAs in Zn vapor atmosphere. By using a SiN hard mask, the n-type GaAs is converted to p-type GaAs locally to form the p-n junction, which may be used as the active layer 746. An electrode 748 may be disposed on the active layer 746.

Figure 7D:
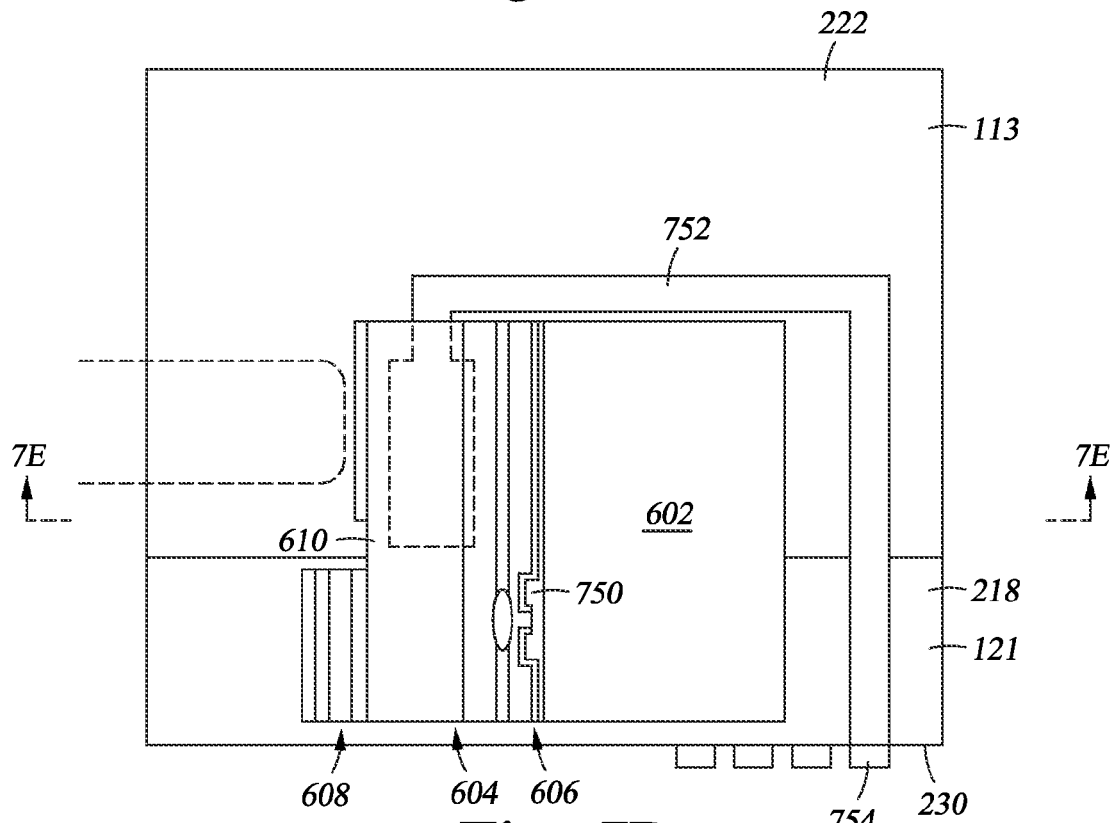
Figure 7E:
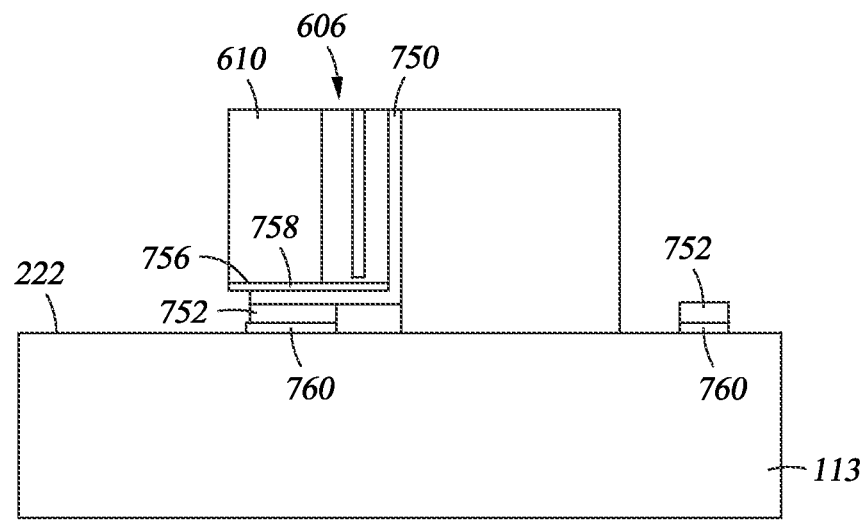

FIG. 7D is a top view of the structure 604 according to embodiments described herein. The structure 604 may include the laser diode 606 and the photodiode 608 and may be coupled to the submount 602. An electrode 750 may be disposed between the submount 602 and the laser diode 606 and may be electrically coupled to a pad 752 disposed over the surfaces 218, 222. The pad 752 may be electrically coupled to a pad 754 disposed on the trailing surface 230, and the pad 754 may be electrically coupled to an electrode (not shown) on suspension. Both pads 752, 754 may be made of an electrically conductive material. FIG. 7E is a cross sectional side view at line "7E" shown in FIG. 7D. The laser diode 606 has a bottom surface 756 facing the surface 222 of the slider 113. A first insulator layer 758 may be disposed below the bottom surface 756 and the electrode 750 is disposed below the first insulator layer 758. The pad 752 may be disposed below and in contact with the electrode 750. Disposed below the pad 752 is a second insulator layer 760, which is disposed on the surface 222 of the slider 113. In one embodiment, the structure 604 is supported by the second insulator layer 760, the pad 752 and the electrode 750, thus the submount 602 may not be present.

Figure 8:
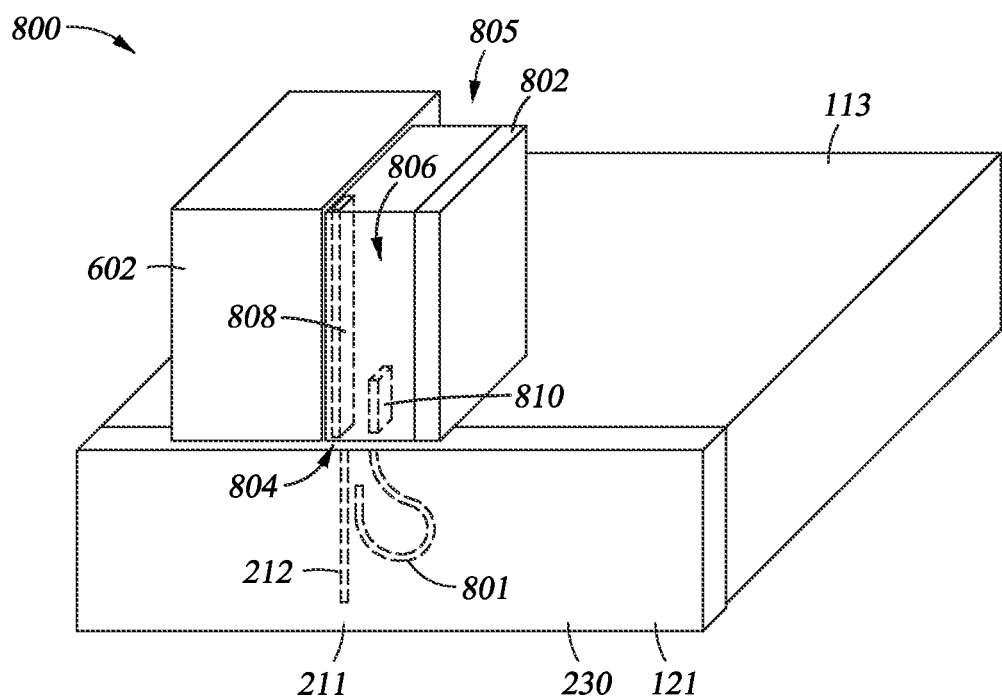
FIG. 8 is a perspective view of a magnetic recording device according to embodiments described herein.

FIG. 8 is a perspective view of a magnetic recording device 800 according to embodiments described herein. The magnetic recording device 800 may include the slider 113 and the magnetic head assembly 121 coupled to the slider 113. The magnetic head assembly 121 may include the magnetic write head 211, which may include the first waveguide 212 and a second waveguide 801. The waveguides 212, 801 may be embedded in the magnetic write head 211, thus are represented using dotted lines. A structure 805 may be disposed over the magnetic write head 211 and the slider 113. The structure 805 may be coupled to a submount 602, and the submount 602 may be disposed on the slider 113.

The structure 805 may include a radiation source, such as a laser diode 804, and a power monitoring device, such as a photodiode 806. In other words, the photodiode 806 may be integrated into the laser diode 804. Both the laser diode 804 and the photodiode 806 include a common substrate 802. In one embodiment, the substrate 802 is oriented substantially perpendicular to the trailing surface 230 of the magnetic write head 211. In other words, the surface of the substrate 802 having the largest surface area may be substantially perpendicular to the trailing surface 230 of the magnetic write head 211. The laser diode 804 may include an active layer 808, which may be embedded in the laser diode 804 and optically aligned with the first waveguide 212. The photodiode 806 may include an active layer 810 that may or may not be aligned with the second waveguide 801. The laser diode 804 and the photodiode 806 are located on the same side of the substrate 802. By integrating the photodiode 806 and the laser diode 804 into the structure 805, the photodiode 806 and the laser diode 804 may be fabricated at the same time using the same tools, leading to a reduction in fabrication cost. The laser diode 804 may be any suitable laser diode, and the photodiode 806 may be a p-n junction, p-i-n junction, metal-semiconductor junction (Schottky barrier), or any other structure that can detect light.

Figure 9A:
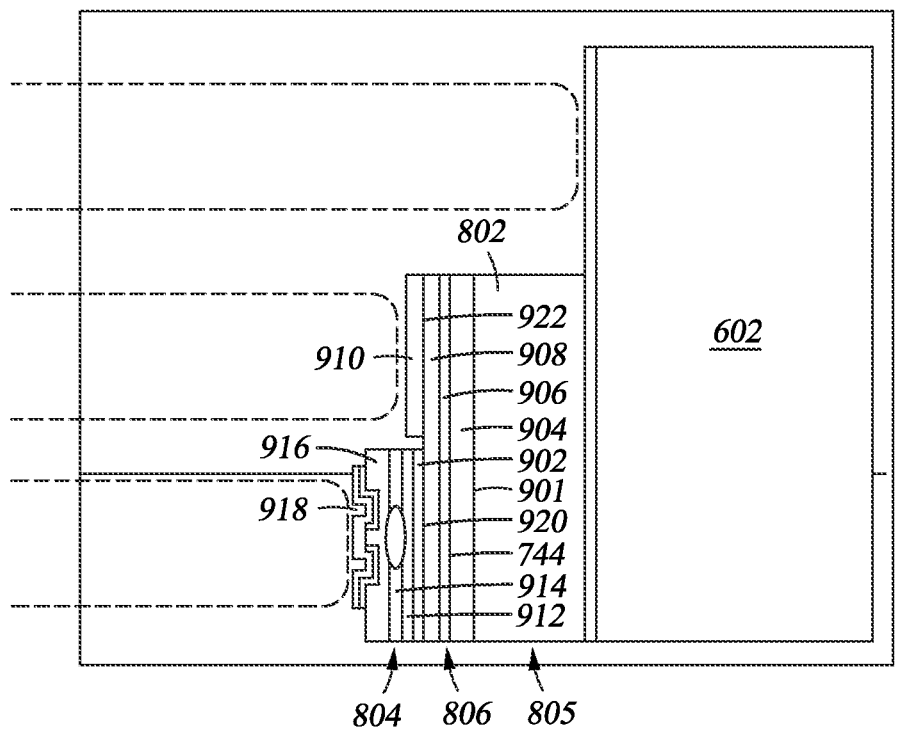
FIGS. 9A-9D illustrate a structure having a laser diode and a photodiode disposed over a slider according to embodiments described herein.

FIGS. 9A-9D illustrate the structure 805 including the laser diode 804 and the photodiode 806 according to embodiments described herein. FIG. 9A is a top view of the structure 805. The structure 805 may include the laser diode 804 and the photodiode 806. The laser diode 804 and the photodiode 806 may be disposed side by side adjacent a side 901 of the substrate 802, unlike the structure 604 in which the substrate 610 is disposed between the laser diode and the photodiode. The structure 805 may be coupled to the submount 602. To prevent the laser light from being directly detected by the photodiode 806 and prevent unabsorbed light from getting into the laser cavity of the laser diode 804, an optical shield 902 may be disposed between the laser diode 804 and the photodiode 806. The optical shield 902 may be any material that absorbs or reflects light. In one embodiment, a semiconductor layer is used as the optical shield 902. The optical shied 902 may be a multilayer structure including dielectric layers having different refractive indices. The thickness of each dielectric layer may be optimized to have low light transmittance.

The photodiode 806 may be deposited on the substrate 802, the optical shield 902 may be deposited on the photodiode 806 and the laser diode 804 may be deposited on the optical shield 902. The photodiode 806 may include a first cladding layer 904, an active layer 906 and a second cladding layer 908. The first cladding layer may be an n-type layer, the second cladding layer 908 may be a p-type layer, and the active layer may be a p-n junction. The first cladding layer 904 may be disposed on the surface 901 of the substrate 802. In one embodiment, the first cladding layer 904 covers the entire surface 901 of the substrate 802. The optical shield 902 may be disposed on a first portion 920 of the second cladding layer 908, and an electrode 910 may be disposed on a second portion 922 of the second cladding layer 908. The laser diode 804 may include a first cladding layer 912, a second cladding layer 916 and an active layer 914 disposed between the first and second cladding layers 912, 916. The first cladding layer 912 may be a p-type layer and the second cladding layer 916 may be an n-type layer, thus the optical shield 902 may be disposed between two p-type layers 908, 912. An electrode 918 may be disposed over the second cladding layer 916. In one embodiment, as shown in FIG. 9A, two electrodes 910, 918 are disposed over the substrate 802.

Figure 9B:
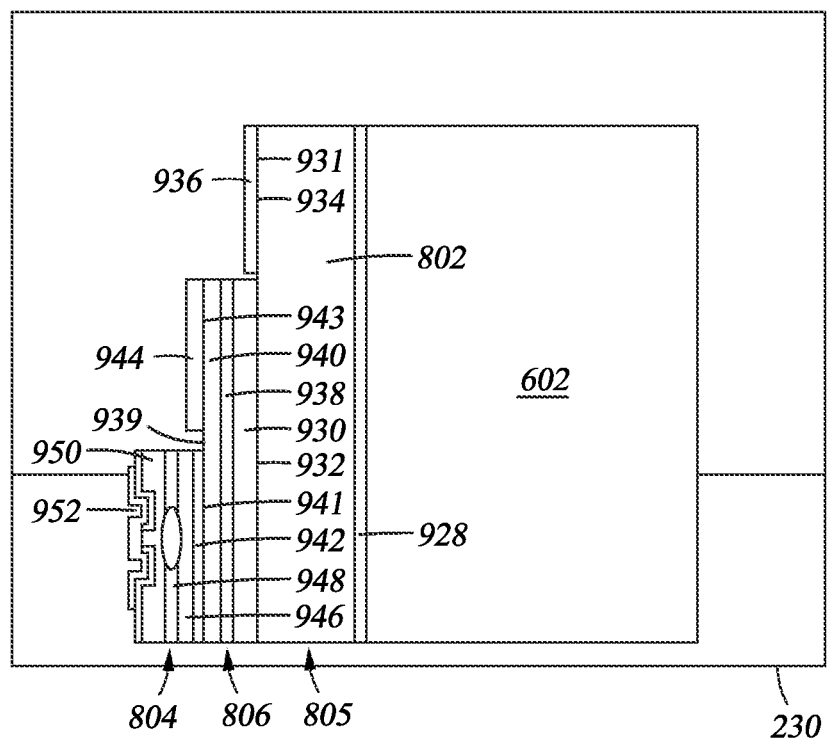

FIG. 9B is a top view of the structure 805 according to embodiments described herein. The structure 805 includes the substrate 802 coupled to the submount 602 via an electrode 928. The substrate 802 has a surface 931 that is substantially perpendicular to the trailing surface 230. An electrode 936 may be disposed over a first portion 934 of the surface 931 of the substrate 802 and the photodiode 806 may be disposed over a second portion 932 of the surface 931 of the substrate 802. The photodiode 806 may include a first cladding layer 930 disposed over the portion 932 of the surface 931 of the substrate 802. An active layer 938 may be disposed over the first cladding layer 930 and a second cladding layer 940 may be disposed over the active layer 938. The first cladding layer 930 may be an n-type layer and the second cladding layer 940 may be a p-type layer. The second cladding layer 940 may have a surface 939 opposite the surface that is coupled to the active layer 938. An electrode 944 may be disposed over a first portion 943 of the surface 939 and an optical shield 942 may be disposed over a second portion 941 of the surface 939. The optical shield 942 may be made of the same material as the optical shield 902.

The laser diode 804 may be disposed over the optical shield 942. The laser diode 804 may include a first cladding layer 946, an active layer 948 and a second cladding layer 950. The first cladding layer 946 may be a p-type layer and the second cladding layer 950 may be an n-type layer. An electrode 952 may be disposed over the second cladding layer 950. The optical shield 942 may be disposed between two p-type layers 940, 946 and three electrodes 936, 944, 952 may be disposed over the substrate 802.

Figure 9C:
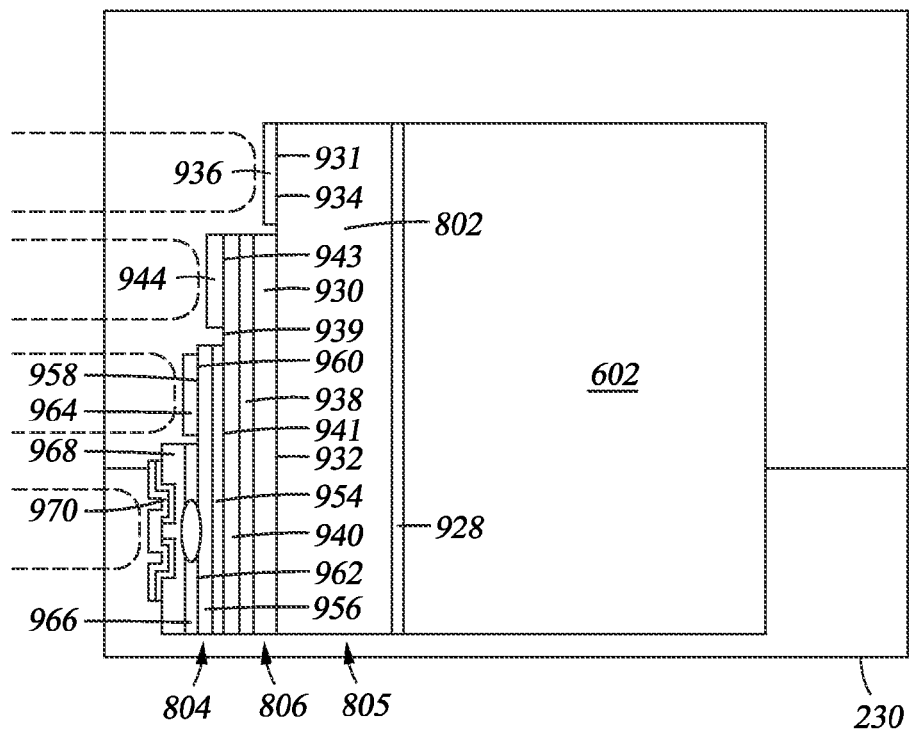

FIG. 9C is a top view of the structure 805 according to embodiments described herein. The structure 805 includes the substrate 802 coupled to the submount 602 via an electrode 928. The substrate 802 has a surface 931 that is substantially perpendicular to the trailing surface 230. The electrode 936 may be disposed over the first portion 934 of the surface 931 of the substrate 802 and the photodiode 806 may be disposed over the second portion 932 of the surface 931 of the substrate 802. The photodiode 806 may include the first cladding layer 930 disposed over the portion 932 of the surface 931 of the substrate 802. The active layer 938 may be disposed over the first cladding layer 930 and the second cladding layer 940 may be disposed over the active layer 938. The first cladding layer 930 may be an n-type layer and the second cladding layer 940 may be a p-type layer. The second cladding layer 940 may have the surface 939 opposite the surface that is coupled to the active layer 938. The electrode 944 may be disposed over the first portion 943 of the surface 939 and an optical shield 954 may be disposed over the second portion 941 of the surface 939. The optical shield 954 may be any electrically insulating material that absorbs or reflects light. By electrically insulating the photodiode 806 and the laser diode 804, electrical interference between the photodiode 806 and the laser diode 804 when the laser diode 804 is modulated at a high frequency is reduced.

The laser diode 804 may be disposed over the optical shield 954. The laser diode 804 may include a first cladding layer 956, an active layer 966 and a second cladding layer 968. The first cladding layer 956 may have a surface 958 and an electrode 964 may be disposed over a first portion 960 of the surface 958. The active layer 966 may be disposed over a second portion 962 of the surface 958. The second cladding layer 968 may be disposed over the active layer 966 and an electrode 970 may be disposed over the second cladding layer 968. The first cladding layer 956 may be an n-type layer and the second cladding layer 968 may be a p-type layer. The optical shield 954 may be disposed between a p-type layer 940 and an n-type layer 956 and four electrodes 936, 944, 964, 970 may be disposed over the substrate 802.

Figure 9D:
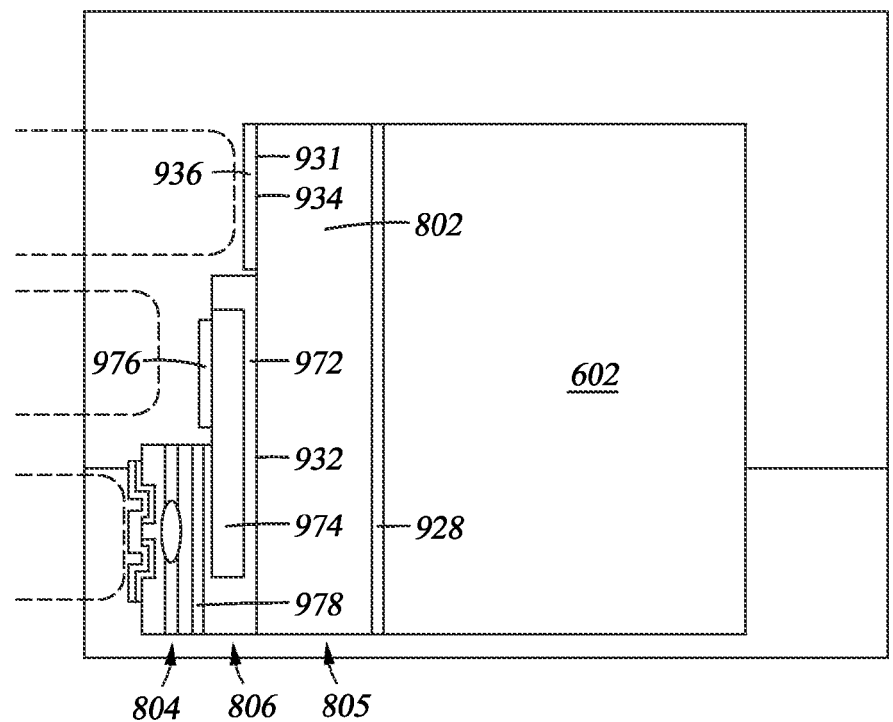

FIG. 9D is a top view of the structure 805 according to embodiments described herein. The structure 805 includes the substrate 802 coupled to the submount 602 via an electrode 928. The substrate 802 has a surface 931 that is substantially perpendicular to the trailing surface 230. The electrode 936 may be disposed over the first portion 934 of the surface 931 of the substrate 802 and the photodiode 806 may be disposed over the second portion 932 of the surface 931 of the substrate 802. The photodiode 806 may include a cladding layer 972 and an ion doped active region 974 embedded in the cladding layer 972. The cladding layer 972 may be an n-type GaAs layer and the active region 974 may be an ion doped p-n junction. In one embodiment, the active region 974 may be a $Zn^+$ ion doped p-n junction. The $Zn^+$ ion doped p-n junction may be formed by $Zn^+$ ion implant or thermal diffusion of Zn into n-type GaAs in Zn vapor atmosphere. By using a SiN hard mask, the n-type GaAs is converted to p-type GaAs locally to form the p-n junction, which may be used as the active region 974. An electrode 976 may be disposed over a portion of the active region 974. An optical shield 978 may be disposed over a portion of the cladding layer 972 and the optical shield 978 may be made of the same material as the optical shield 902. The laser diode 804 may be disposed over the optical shield 978.

Figure 10A:
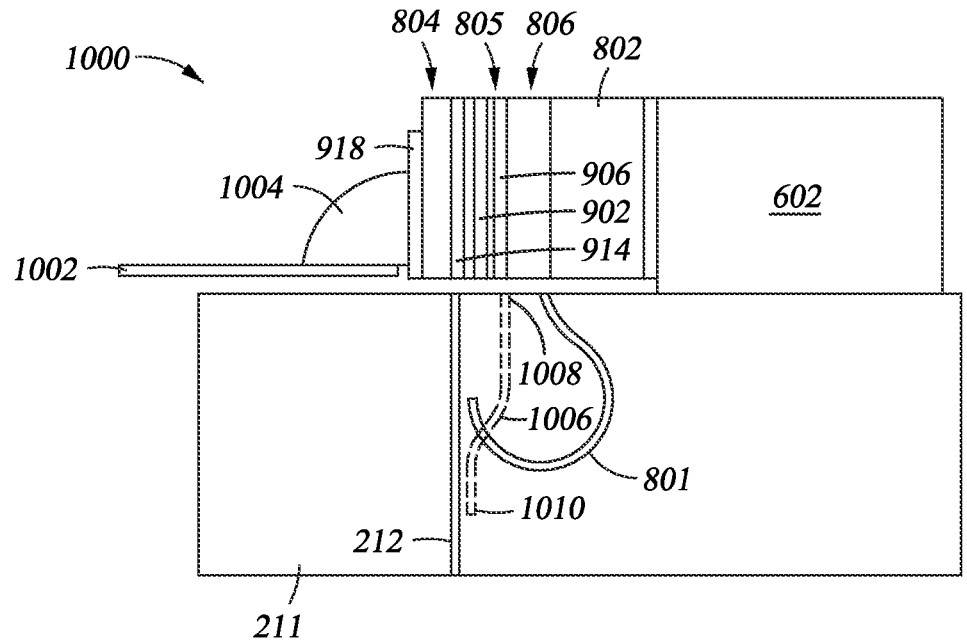
FIGS. 10A-10B illustrate a magnetic recording device according to embodiments described herein.
Figure 10B:
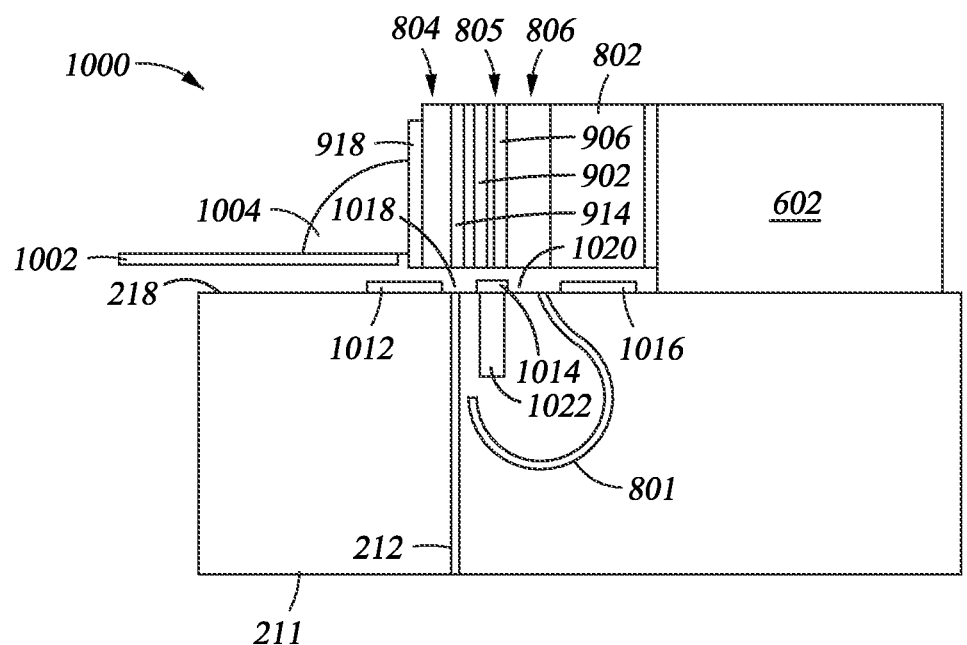

FIGS. 10A-10B illustrate a magnetic recording device 1000 according to embodiments described herein. The magnetic recording device 1000 may include the structure 805 coupled to the submount 602 and the structure 805 may include the laser diode 804 and the photodiode 806 separated by the optical shield 902. The laser diode 804 may include the active layer 914 and the photodiode 806 may include the active layer 906. The electrode 918 may be coupled to a suspended electrode 1002 via solder 1004. Solder 1004 may be any electrically conductive material, such as silver paste. Embedded in the magnetic write head 211 are the first waveguide 212 that is optically aligned with the active layer 914 of the laser diode 804 and the second waveguide 801 that is optically aligned with the active layer 906 of the photodiode 806, so that the light from the second waveguide 801 is introduced into the bottom or side surface of the active layer 906 of the photodiode 806. As shown in FIG. 10A, the light is introduced into the side surface of the active layer 906 of the photodiode 806. Alternatively, the active layer 906 of the photodiode 806 may be optically aligned with a waveguide 1006. The waveguide 1006 may have two ends 1008, 1010. The end 1008 may be aligned with the active layer 906 and the end 1010 may be proximate an end of the first waveguide 212 or proximate an NFT (not shown). Instead of measuring the light coupled to the first waveguide 212, light reflected at the NFT or at the end of the first waveguide 212 maybe measured by the photodiode 806. In one embodiment, the optical shield 902 and the second waveguide 801 or the alternate waveguide 1006 are not present, and the photodiode 806 directly measures the laser light from the laser diode 804.

FIG. 10B illustrates the magnetic recording device 1000 according to embodiments described herein. Optical shields 1012, 1014, 1016 may be formed on the surface 218 below the structure 805. Optical shields 1012, 1014, 1016 may be made of the same material as the optical shield 902 and may be made of a multilayer structure. A first aperture 1018 and a second aperture 1020 may be formed between the optical shields 1012, 1014, 1016. The first and second apertures 1018, 1020 may be circular and have a diameter of about 5 microns. The diameter of the apertures 1018, 1020 may be based on the size of the laser beam and alignment accuracy for the apertures 1018, 1020. The first aperture 1018 may be aligned with the active layer 914 of the laser diode 804 and the first waveguide 212 for allowing the laser beam to pass from the active layer 914 to the first waveguide 212. The second aperture 1018 may be aligned with the second waveguide 801 for allowing the photodiode 806 to detect the laser beam coming out of the second waveguide 801. Because the second waveguide 801 may be slanted, the aperture 1020 may not be aligned with the active layer 906 of the photodiode 806. Alternatively or in addition to the optical shields 1012, 1014, 1016, an optical shield 1022 may be embedded in the magnetic write head 211 between the first waveguide 212 and the second waveguide 801. The optical shield 1022 helps reduce the influence of stray light. FIGS. 9A-9D and 10A-10B show that the photodiode 806 is disposed between the laser diode 804 and the substrate 802. Alternatively, the laser diode 804 may be disposed between the photodiode 806 and the substrate 802.

Figure 11:
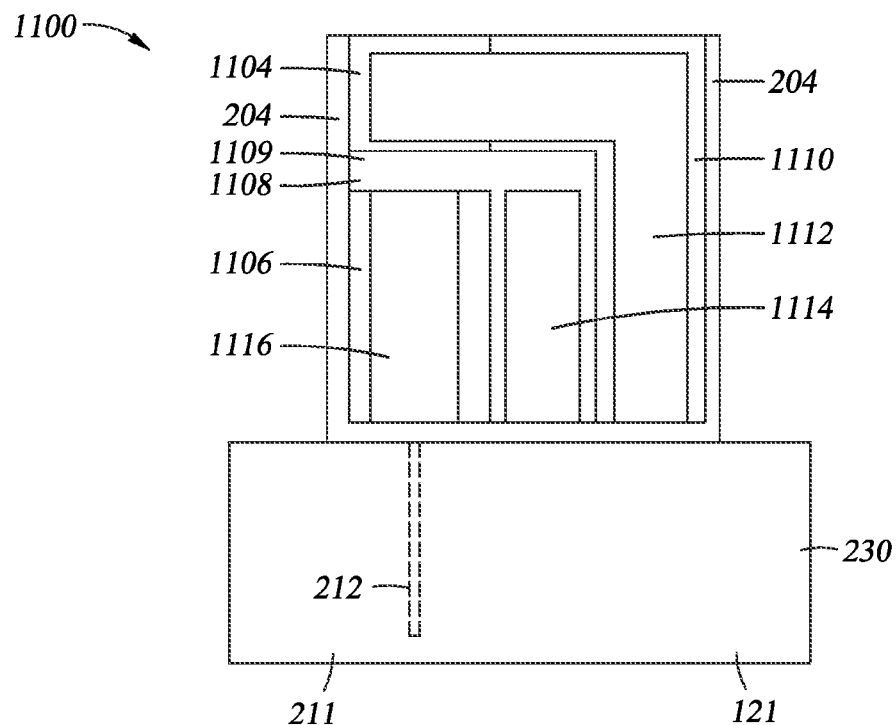
FIG. 11 illustrates a magnetic recording device according to embodiments described herein.

FIG. 11 is a front view of a magnetic recording device 1100 according to embodiments described herein. The magnetic recording device 1100 may include the submount 204 and a substrate 1108 coupled to the submount 204. The substrate 1108 may have a surface that is substantially parallel to the trailing surface 230. A laser diode 1106 may be disposed on the substrate over the magnetic write head 211 and a photodiode 1104 may be disposed over the laser diode 1106. A gap 1109 may be formed between the laser diode 1106 and the photodiode 1104. An electrode 1112 may be disposed adjacent the photodiode 1104, an electrode 1114 may be disposed adjacent the substrate 1108 and an electrode 1116 may be disposed adjacent the laser diode 1106. An insulating material 1110 may be disposed between the substrate and the electrode 1112. The laser diode 1106 may be any suitable laser diode, and the photodiode 1104 may be a p-n junction, p-i-n junction, metal-semiconductor junction (Schottky barrier), or any other structure that can detect light. In this configuration, the photodiode 1104 detects laser light from the back facet of the laser diode 1106. By detecting the laser light at the back facet of the laser diode 1106, the laser power that is independent of the laser diode 1106 and waveguide 212 coupling efficiency can be measured.

Figure 12:
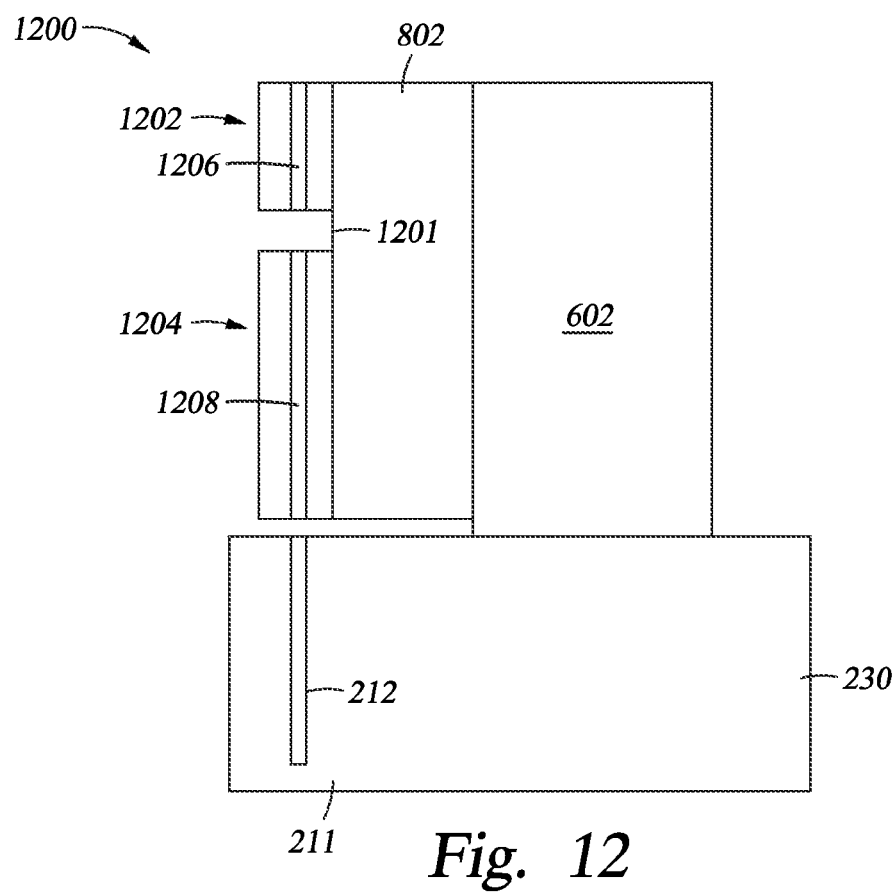
FIG. 12 illustrates a magnetic recording device according to embodiments described herein.

FIG. 12 illustrates a magnetic recording device 1200 according to embodiments described herein. The magnetic recording device 1200 may include the submount 602 and the substrate 802 coupled to the submount 602. The substrate 802 may include a surface 1201 that is substantially perpendicular to the trailing surface 230. A laser diode 1204 may be coupled to the substrate 802 over the waveguide 212 and a photodiode 1202 may be coupled to the substrate 802 over the laser diode 1204. The photodiode 1202 may have an active layer 1206 and the laser diode 1204 may have an active layer 1208. The active layers 1202, 1208 may be aligned with the waveguide 212. The laser diode 1204 may be any suitable laser diode, and the photodiode 1206 may be a p-n junction, p-i-n junction, metal-semiconductor junction (Schottky barrier), or any other structure that can detect light. In this configuration, the photodiode 1202 detects laser light from the back facet of the laser diode 1204. By detecting the laser light at the back facet of the laser diode 1204, the laser power that is independent of the laser diode 1204 and waveguide 212 coupling efficiency can be measured.

Figure 13A:
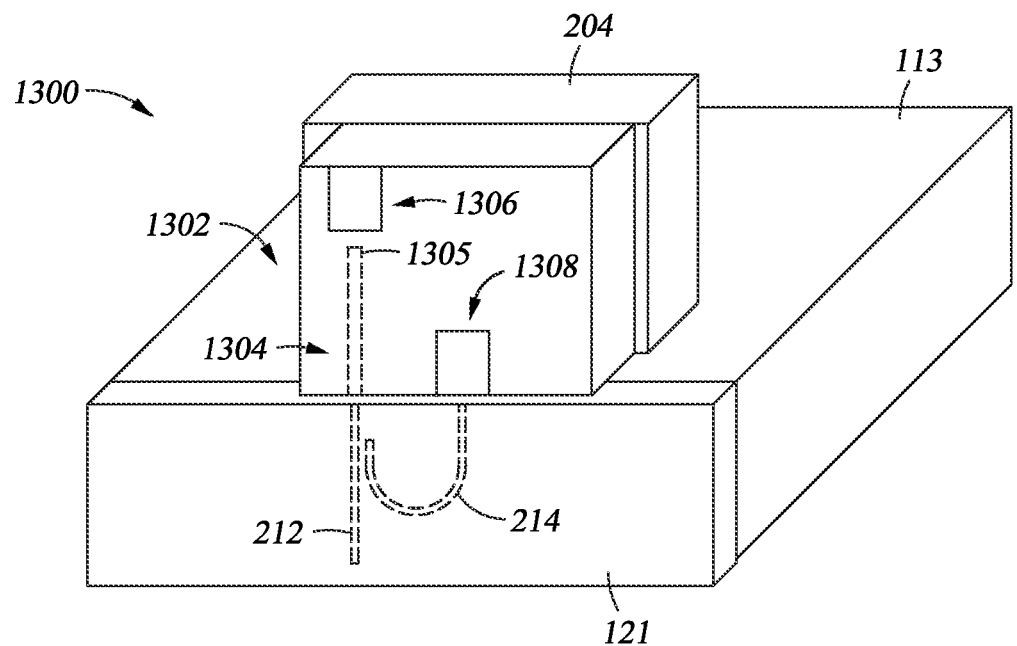
FIGS. 13A-13C illustrate a magnetic recording device according to embodiments described herein.
Figure 13B:
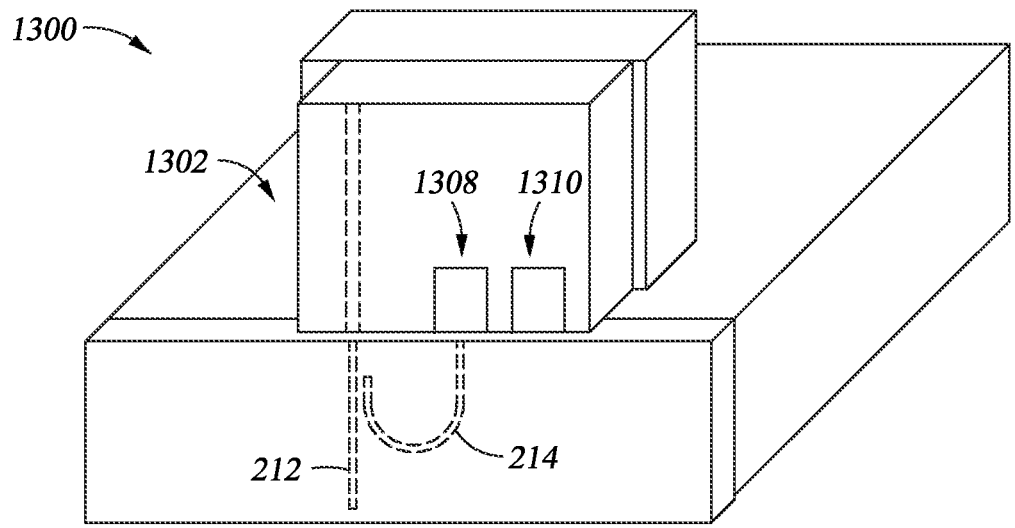
Figure 13C:
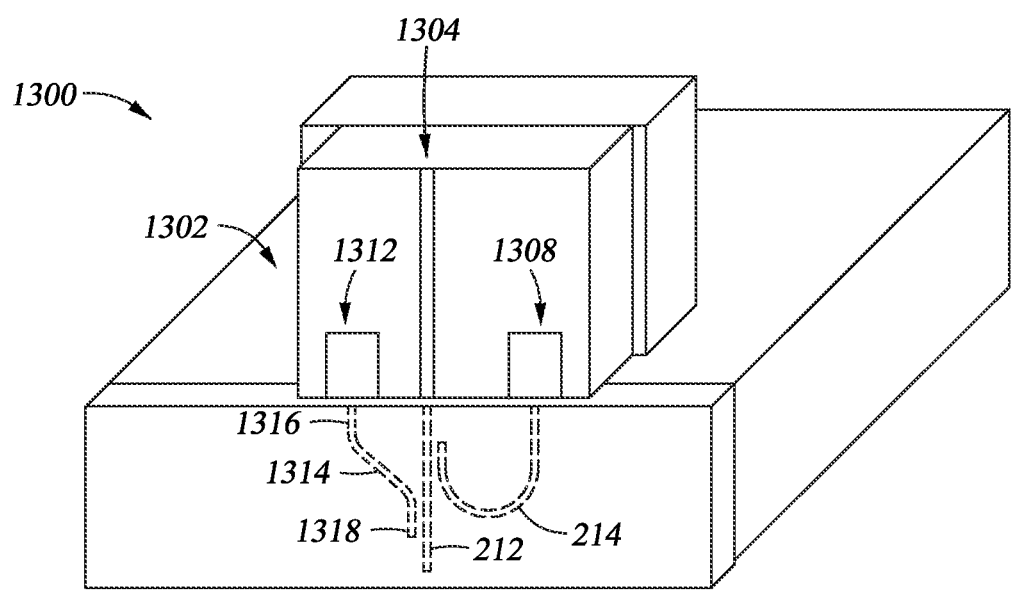

FIGS. 13A-13C illustrate a magnetic recording device 1300 including a structure 1302 that has two photodiodes according to embodiments described herein. As shown in FIG. 13A, the structure 1302 is coupled to the submount 204 and the structure 1302 includes a laser diode 1304, a first photodiode 1306 and a second photodiode 1308. The laser diode 1304 may include an active layer 1305 that is aligned with an active layer (not shown) of the first photodiode 1306. The first photodiode 1306 measures laser light from the back facet of the laser diode 1304. The second photodiode 1308 may be used to measure laser light emitted from the second waveguide 214, and the measured intensity depends on the coupling efficiency between the laser diode 1304 and the waveguide 212. By measuring the laser light at two locations, cause of laser power change can be identified (change in laser power or change in coupling efficiency).

FIG. 13B illustrates another embodiment of the structure 1302 having two photodiodes 1308, 1310. The photodiode 1310 may be disposed next to the photodiode 1308, which may be used for differential detection. When background signal caused by stray light or electrical noise is included in the photodiode signal, the background signal may be removed by subtracting the photodiode 1310 signal from the photodiode 1308 signal. FIG. 13C illustrates another embodiment of the structure 1302 having two photodiodes 1308, 1312. In this embodiment, the laser diode 1304 is disposed between the photodiodes 1308, 1312. The photodiode 1312 may be aligned with an end 1316 of a third waveguide 1314. The other end 1318 of the third waveguide 1314 may be proximate the NFT. Light reflected from the NFT is guided into the third waveguide 1314 and detected by the photodiode 1312. The reflected intensity depends on the spacing between the NFT and the magnetic medium (not shown). The space is also known as the fly height. By detecting the reflected light using the photodiode 1312, fly height change can be monitored. Laser diode 1304 may be any suitable laser diode, and the photodiodes 1306, 1308, 1310, 1312 may be a p-n junction, p-i-n junction, metal-semiconductor junction (Schottky barrier), or any other structure that can detect light. Two photodiodes configuration is not limited to the magnetic recording device in which the substrate has the largest surface that is substantially parallel to the trailing surface. Additional photodiode may be added to the structure 604 as shown in FIG. 6 and to the structure 805 as shown in FIG. 8.

In summary, a magnetic recording device including a structure having a laser diode and at least one photodiode is disclosed. Because the laser diode and the photodiode are integrated, the laser diode and the photodiode may be fabricated at the same time using the same tools. Cost relating to fabricating individual, discrete photodiodes is reduced.

While the foregoing is directed to embodiments of the disclosure, other and further embodiments may be devised without departing from the basic scope thereof, and the scope thereof is determined by the claims that follow.

What is claimed is:

1. A magnetic recording device, comprising:
   a slider;
   a magnetic head assembly coupled to the slider;
   a submount disposed over the slider and the magnetic head assembly; and
   a structure coupled to the submount, wherein the structure is disposed over the magnetic head assembly, and wherein the structure includes:
   a laser diode having a substrate; and
   a photodiode, wherein the photodiode shares the substrate with the laser diode, and wherein the substrate is distinct from the magnetic head assembly and the submount, wherein the magnetic head assembly includes a magnetic write head having a trailing surface, the substrate has a surface with a largest surface area, and the surface with the largest surface area is substantially parallel to the trailing surface.

2. The magnetic recording device of claim 1, wherein the laser diode includes an active layer and the photodiode includes an active layer, and the active layers of the photodiode and the laser diode are aligned in a cross-track direction.

3. The magnetic recording device of claim 1, wherein the laser diode includes an active layer and the photodiode includes an active layer, and the active layers of the photodiode and the laser diode are offset in a cross-track direction.

4. The magnetic recording device of claim 1, further comprising one or more reflection layers coupled to one or more surfaces of the photodiode.

5. A magnetic recording device, comprising:
a slider;
a magnetic head assembly coupled to the slider;
a submount disposed over the slider and the magnetic head assembly; and
a structure coupled to the submount, wherein the structure is disposed over the magnetic head assembly, and wherein the structure includes:
  a laser diode having a substrate; and
  a photodiode, wherein the photodiode shares the substrate with the laser diode, and wherein the substrate is distinct from the magnetic head assembly and the submount, wherein the magnetic head assembly includes a magnetic write head having a trailing surface, the substrate has a surface with a largest surface area, and the surface with the largest surface area is substantially perpendicular to the trailing surface.

6. The magnetic recording device of claim 5, wherein the substrate is disposed between the laser diode and the photodiode.

7. The magnetic recording device of claim 5, wherein the laser diode and the photodiode are disposed on a side of the substrate.

8. The magnetic recording device of claim 7, further comprising an optical shield disposed between the laser diode and the photodiode.

9. A magnetic recording device, comprising:
a slider;
a magnetic head assembly coupled to the slider;
a submount disposed over the slider and the magnetic head assembly; and
a structure coupled to the submount, wherein the structure is disposed over the magnetic head assembly, and wherein the structure includes:
  a laser diode having a substrate; and
  a photodiode, wherein the photodiode shares the substrate with the laser diode, and wherein the substrate is distinct from the magnetic head assembly and the submount, further comprising a pad disposed between the magnetic head assembly and the photodiode, wherein the pad is in contact with an electrode coupled to the photodiode.

10. A magnetic recording device, comprising:
a slider;
a magnetic head assembly coupled to the slider;
a submount disposed over the slider and the magnetic head assembly; and
a structure coupled to the submount, wherein the structure is disposed over the magnetic head assembly, and wherein the structure includes:
  a laser diode having a substrate; and
  a photodiode, wherein the photodiode shares the substrate with the laser diode, and wherein the substrate is distinct from the magnetic head assembly and the submount, wherein the laser diode is disposed between the photodiode and the magnetic head assembly.

11. A heat-assisted magnetic recording system, comprising:
a slider;
a magnetic write head, wherein the magnetic write head includes a first waveguide;
a submount disposed over the slider and the magnetic write head; and
a structure coupled to the submount, wherein the structure is disposed over the magnetic write head, and wherein the structure includes:
  a laser diode having a substrate and an active layer, wherein the active layer is aligned with the first waveguide; and
  a first photodiode, wherein the first photodiode shares the substrate with the laser diode.

12. The heat-assisted magnetic recording system of claim 11, wherein the substrate is a n-type substrate.

13. The heat-assisted magnetic recording system of claim 11, wherein the magnetic write head includes a trailing surface, the substrate has a surface with a largest surface area, and the surface with the largest surface area is substantially parallel to the trailing surface.

14. The heat-assisted magnetic recording system of claim 11, wherein the magnetic write head includes a trailing surface, the substrate has a surface with a largest surface area, and the surface with the largest surface area is substantially perpendicular to the trailing surface.

15. The heat-assisted magnetic recording system of claim 11, wherein the structure further comprises a second photodiode.

16. A hard disk drive, comprising:
a magnetic media;
a slider including a media facing surface and a surface opposite the media facing surface;
a magnetic write head coupled to the slider, wherein the magnetic write head has a media facing surface and a surface opposite the media facing surface;
a submount disposed over the slider and the magnetic write head; and
a structure coupled to the submount, wherein the structure is disposed over the magnetic write head, and wherein the structure includes:
  a laser diode disposed above the surface of the slider and the surface of the magnetic write head, wherein the laser diode includes a substrate; and
a photodiode disposed above the surface of the slider and the surface of the magnetic write head, wherein the photodiode and the laser diode share the substrate, wherein the magnetic write head includes a trailing surface, the substrate has a surface with a largest surface area, and the surface with the largest surface area is substantially parallel to the trailing surface.

17. A hard disk drive, comprising:
a magnetic media;
a slider including a media facing surface and a surface opposite the media facing surface;
a magnetic write head coupled to the slider, wherein the magnetic write head has a media facing surface and a surface opposite the media facing surface;
a submount disposed over the slider and the magnetic write head; and
a structure coupled to the submount, wherein the structure is disposed over the magnetic write head, and wherein the structure includes:

a laser diode disposed above the surface of the slider and the surface of the magnetic write head, wherein the laser diode includes a substrate; and a photodiode disposed above the surface of the slider and the surface of the magnetic write head, wherein the photodiode and the laser diode share the substrate, wherein the magnetic write head includes a trailing surface, the substrate has a surface with a largest surface area, and the surface with the largest surface area is substantially perpendicular to the trailing surface.

* * * * *